United States Patent
Sun et al.

(10) Patent No.: US 10,269,380 B1
(45) Date of Patent: Apr. 23, 2019

(54) DISK DRIVE HAVING MULTIPLE DISKS ACCESSIBLE BY A REDUCED NUMBER OF READ/WRITE HEADS

(71) Applicant: Seagate Technology LLC, Cupertino, CA (US)

(72) Inventors: Hao Sun, Singapore (SG); ChuenBuan Lee, Singapore (SG); Xiong Liu, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/811,978

(22) Filed: Nov. 14, 2017

(51) Int. Cl.
  *G11B 5/54* (2006.01)
  *G11B 5/48* (2006.01)
  *G11B 5/55* (2006.01)
  *G11B 17/02* (2006.01)

(52) U.S. Cl.
  CPC ............. *G11B 5/54* (2013.01); *G11B 5/4813* (2013.01); *G11B 5/5521* (2013.01); *G11B 17/021* (2013.01)

(58) Field of Classification Search
  None
  See application file for complete search history.

(56) References Cited

U.S. PATENT DOCUMENTS

| | | | | |
|---|---|---|---|---|
| 3,940,794 A | * | 2/1976 | Griffiths et al. | G11B 17/021 360/98.03 |
| 4,092,681 A | * | 5/1978 | Dix et al. | G11B 17/021 360/98.02 |
| 4,835,641 A | * | 5/1989 | Maeda | G11B 5/4813 360/246.8 |
| 8,112,580 B2 | | 2/2012 | Bandic et al. | |
| 8,958,172 B1 | | 2/2015 | Hansen | |
| 9,218,833 B1 | | 12/2015 | Shah et al. | |
| 2010/0091408 A1 | * | 4/2010 | Albrecht et al. | G11B 17/021 360/244 |
| 2010/0182716 A1 | * | 7/2010 | Bandic et al. | G11B 5/5521 360/75 |

(Continued)

OTHER PUBLICATIONS

"Inside a hard drive," http://www.southbit.co.za/inside-a-hard-drive/, 11 pages,Southbit Data Recovery Specialists, www.Southbit.co.za, 2010-2017.

(Continued)

*Primary Examiner* — Craig A. Renner
(74) *Attorney, Agent, or Firm* — Kagan Binder, PLLC

(57) ABSTRACT

A disk drive including multiple magnetic recording disks and at least one read/write head, wherein the disk drive includes a rotatable center block having a vertical axis and a mounting member, a first motor attached to the center block for rotating the center block about the vertical axis, a vertical threaded rod positioned in the mounting member, a second motor moveable along the vertical threaded rod, at least one head suspension arm extending outwardly from the second motor, and at least one read/write head mounted to a distal end of one of the arms. The disk drive further includes multiple disks in a stack, wherein at least one of the arms is vertically moveable along the vertical threaded rod by the second motor to position the at least one read/write head in a position to access data on one of the disk surfaces of the plurality of disks.

16 Claims, 9 Drawing Sheets

(56) References Cited

U.S. PATENT DOCUMENTS

2010/0205623 A1* 8/2010 Molaro et al. ....... G11B 17/021
720/672

OTHER PUBLICATIONS

Rubtsov, Artem, "HDD from Inside: Hard Drive Main Parts," http://hddscan.com/doc/HDD_from_inside.html, 10 pages, www.HDDScan.com, 2016.

HddSurgery, "Guide for using HDDSurgery head change tools: HDDS HGST 2.5" Ramp Set," http://hddsurgery.com/pdfs/HDDSHGST2.5RarnpSet.pdf, 32 pages, www.hddsurgery.com, Feb. 17, 2016.

Squiggle Motors, "The big breakthrough in making smaller parts," http://www.si-scientific.de/img/artikel/ws_si-squiggle.pdf, SI Scientific Instruments GmbH, http://www.si-gmbh.de, 14 pages, Oct. 1, 2008.

* cited by examiner

DISK DRIVE HAVING MULTIPLE DISKS ACCESSIBLE BY A REDUCED NUMBER OF READ/WRITE HEADS

BACKGROUND

Hard disc drive (HDD) systems typically include a stack of data storage disks with concentric tracks containing information and rotated by a spindle motor. Transducing heads or read/write heads carried by a slider are used to read from and write to a data track on the disks, with each disk surface being accessible by a dedicated read/write head. The disks in the stack are in a fixed position relative to one another and are not movable axially, i.e., in a direction parallel to the axis of rotation of the spindle motor. Each read/write head is formed on an air-bearing slider attached to one end of a suspension, and each suspension is attached at its other end to a rigid arm of the actuator.

In order to access information quickly (e.g., for reading and writing data to a disk), a typical HDD will have a read/write head positioned adjacent to each disk surface that is available to read or write data. In such a configuration, the cost of having a read/write head for each disk surface is a relatively large portion of the cost of the HDD, especially in HDDs having large numbers of disks. In particular, each of the multiple read/write heads requires its own physical supporting structures, cabling connections to the HDD electronics, and the like.

FIG. 1 illustrates an exemplary configuration of a conventional hard disk drive (HDD) system 20. The HDD system generally includes a stack including several magnetic storage disks 22 configured to rotate about an axis 24, an actuation motor 26 (e.g., a voice coil motor), multiple actuator arms 28 and corresponding suspension assemblies 30, each of which includes a load beam and a slider 32 carrying a transducing or read/write head (not visible). Each slider 32 is supported by suspension assembly 30, which in turn is supported by an actuator arm 28. Together, each actuator arm 28, suspension assembly 30 and slider 32 form a head stack assembly (HSA).

Actuation motor 26 is configured to pivot actuator arm 28 about an axis 34 in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a microactuator, not seen in FIG. 1. A stack of co-rotating disks 22 are generally provided with pairs of similar or identical actuator arms 28, suspension assemblies 30, and sliders 32 that carry read/write heads for reading and writing the top and bottom surfaces of each disk 22 in the stack. Thus, an exemplary HDD having a 4-disk stack with eight accessible surfaces will include actuator arms, suspension assemblies, and sliders to support eight read/write heads.

Because there is pressure in the industry to lower the cost per unit of data for individual HDD systems, there is an increasing desire to eliminate components and/or provide less expensive components for drives, while maintaining quality and accuracy.

SUMMARY

In accordance with the invention, HDD systems are provided that are more economical for all types of data storage and retrieval, but can be particularly beneficial for systems that include large amounts of "cold" data that is only accessed occasionally. Systems of the invention include at least one read/write head that is moveable to access more than one disk surface, wherein the system includes less read/write heads than disk surfaces to access. That is, an exemplary system with four disks with eight accessible disk surfaces will include less than eight read/write heads, such as one or two read/write heads that are moveable to access all of the disks.

Aspects of the invention described herein are directed to a hard disk drive comprising a plurality of magnetic recording disks and at least one read/write head for writing data to and reading data from the disks. The disk drive includes a rotatable center block comprising a vertical axis and a mounting member or adaptor, a first motor attached to the center block for rotating the center block about the vertical axis, a vertical threaded rod positioned in the mounting member or adaptor, a second motor moveable along the vertical threaded rod, at least one head suspension arm extending outwardly from the second motor, and at least one read/write head mounted to a distal end of one of the head suspension arms. The disk drive further includes multiple disks in a stack, wherein each disk has at least one disk surface containing data storage tracks. At least one of the head suspension arms is vertically moveable along the vertical threaded rod by the motor to position at least one read/write head in a position to access data on one of the disk surfaces of the plurality of disks.

In further accordance with aspects of the invention, the second motor is a piezoelectric motor assembly. Additionally, the mounting member may include an upper plate spaced from a lower plate, and wherein the vertical threaded rod is positioned between the upper and lower plates. The at least one head suspension arm may comprise a first head suspension arm and a second head suspension arm extending outwardly from the second motor, wherein the first and second head suspension arms each comprise a read/write head at a distal end, and wherein the read/write heads of the first and second head suspension arms are offset relative to each other in a offset direction that is perpendicular to a direction in which the second motor moves along the vertical threaded rod. The disk drive may further comprise a ramp with at least one extending ramp fin. wherein the number of extending ramp fins can be the same as the number of disks in the stack, and the ramp may be connected to a third motor that is vertically moveable along a second vertical threaded rod to move the at least one head suspension to access multiple disks of the stack and the third motor may be configured for synchronized movement with the second motor.

The at least one arm may be vertically movable and repositionable along the vertical threaded rod to position the at least one read/write head in multiple vertical locations to access data on multiple disks. The disk drive can further include a fourth motor for rotating the at least one suspension arm 180 degrees relative to surfaces of the disks. The number of disk surfaces of the stack of disks can be greater than the number of read/write heads.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
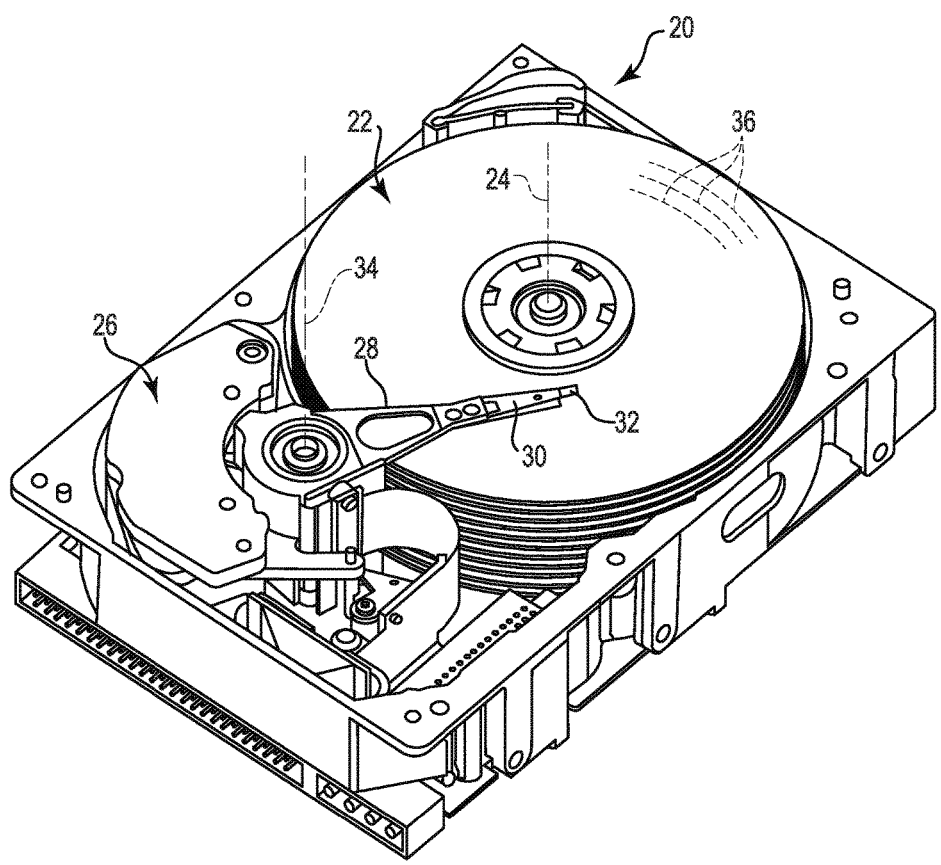
FIG. 1 is a perspective view of an prior art hard disk drive (HDD) system.

The methods and features described herein are applicable to disk drives that can be more economically priced due to reducing the number of read/write heads in the HDD. This is accomplished by enabling single or dual head suspension arms with attached read/write heads to access multiple disk surfaces. This will significantly reduce the cost of the HDD, which can be particularly useful when large portions of the data are not being regularly accessed by the user.

In accordance with configurations of the invention discussed herein, a HDD with a four-disk stack having eight disk surfaces can be provided with less than eight read/write heads. For example, an HDD of the invention may include only one or two of such heads, thereby eliminating the cost of the remaining six or seven read/write heads. Such an elimination of heads in the HDD also eliminates the need for the associated larger number of pre-amps and other electronics, along with the larger number of actuator arms, suspensions, and sliders that support each head. In accordance with the invention, HDD systems are provided that reduce the number of heads while retaining the same number of disks by using a head stack assembly arm that can quickly translate along the height of the disk stack to access more than one disk. This may be accomplished by a miniature piezoelectric motor, as will be discussed herein relative to embodiments of the invention Referring now to the Figures, wherein the components are labeled with like numerals throughout the several Figures, and initially to FIGS. 2 and 3, schematic side and top views are provided of a head stack assembly. HSA 40 generally includes a voice coil 42, a center block 44, a first arm 46 with an associated read/write head 48, a second arm 50 with an associated read/write head 52, a C-shaped adaptor 54, and a piezoelectric motor 56. The voice coil 42 is basically an actuator used to move the arms relative to the surfaces of adjacent disks, and can be associated with a closed-loop feedback system or servo system that is used to dynamically position the heads directly over certain data tracks. In operation, current is fed to the coil which generates an electromagnetic field that causes the heads to move based on attraction or repulsion relative to a permanent magnet. The voice coil 42 is securely attached to the center block 44 to provide a rotary system in which actuation of the voice coil 42 causes rotation in a direction illustrated by reference numeral 60 about an axis 58 that extends through center block 44. Voice coil 42 also causes rotation in a direction opposite that illustrated by reference numeral 60.

Adaptor 54 is referred to herein as a C-shaped adaptor 54, although it is understood that it can have a different shape or configuration than described and illustrated. For example, the adaptor 54 can include flanges or other structures that provide additional structural support or can include one or more angled portions. For this embodiment, however, the adaptor 54 is C-shaped, with an upper member 62 spaced from a lower member 64 by a distance that corresponds with a vertical member 66. The outside surface of vertical member 66 is securely connected to the center block 44, such as with adhesive or fasteners, so that the vertical member 66 and center block 44 are not moveable relative to each other. In addition, a threaded rod 70, along which the piezoelectric motor 56 can move, is connected at its opposite ends within the upper member 62 and lower member 64 of the adaptor 54. Because the upper and lower members 62, 64 constrain the threaded rod 70, the motor 56 is likewise constrained in its travel between the upper and lower members 62, 64.

Figure 4:
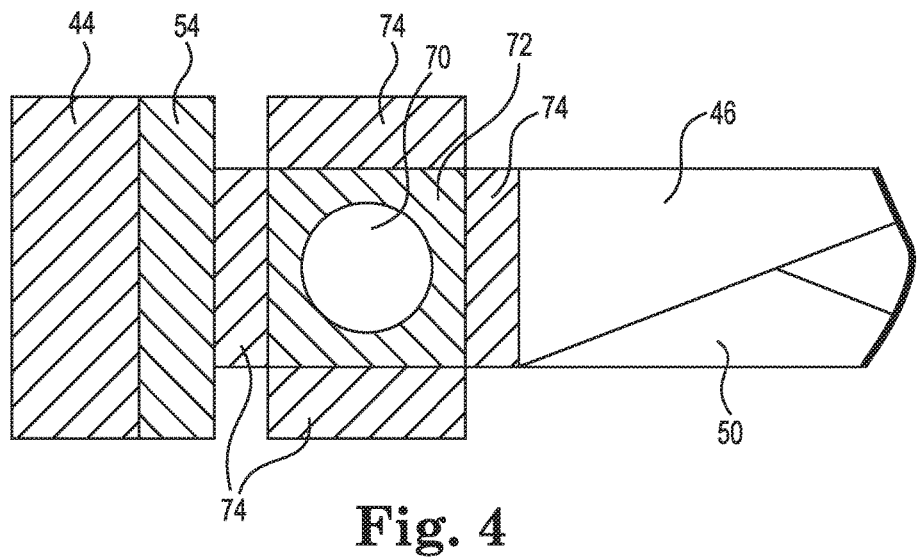
FIG. 4 is an enlarged top cross-sectional view of a portion of an embodiment of a head stack assembly, in accordance with the invention.

Referring additionally to the schematic cross-sectional view of FIG. 4, the piezoelectric motor of this embodiment and other embodiments described herein can be a miniature motor of the type commercially available from Si Scientific Instruments GmbH of Gilching, Germany under the trade designation "Squiggle," for example. The motor or motor assembly 56 generally includes threaded rod 70, a threaded member 72, and multiple plates 74 that are referred to herein as PZT plates, as they are made from a ceramic material such as PZT, or lead zirconate titanate ($Pb[Zr(x)Ti(1-x)]O3$), although they can instead be made of a different material. In particular, FIG. 4 illustrates a configuration that includes four of such PZT plates 74. The threaded rod is inlaid between two holes of the C-shaped adaptor. The only movement allowed for the threaded rod 70 is rotation around its own center axis. The plate 74 that is closest to the adaptor 54 is configured and positioned so that it will be in contact with the adaptor 54 as the motor 56 moves up and down relative to the threaded rod 70. In this way, the plate 74 cannot rotate while the motor 56 is moving vertically. Preferably, the contact surfaces of the leftmost plate 74 and the inside of vertical member 66 of adaptor 54 provide for frictionless or nearly frictionless contact during movement of the motor 56 so that the motor 56 can slide with very little resistance.

The first and second arms 46, 50 extend radially from an outer surface of the piezoelectric motor 56 such that movement of the motor 56 along the threaded rod 70 will provide the desired vertical movement of the arms 46, 50 and their corresponding read/write heads 48, 52. In the embodiment of FIG. 4 that includes four plates 74, arms 46, 50 are securely attached to the rightmost plate 74. As is illustrated in both FIGS. 3 and 4, the arms 46, 50 are configured so that their respective heads 48, 52 are not aligned with each other when viewed from above the assembly. With this offset, the heads 48, 52 are designed to not contact each other even when the motor 56 is moving vertically to access certain disk surfaces.

Figure 5:
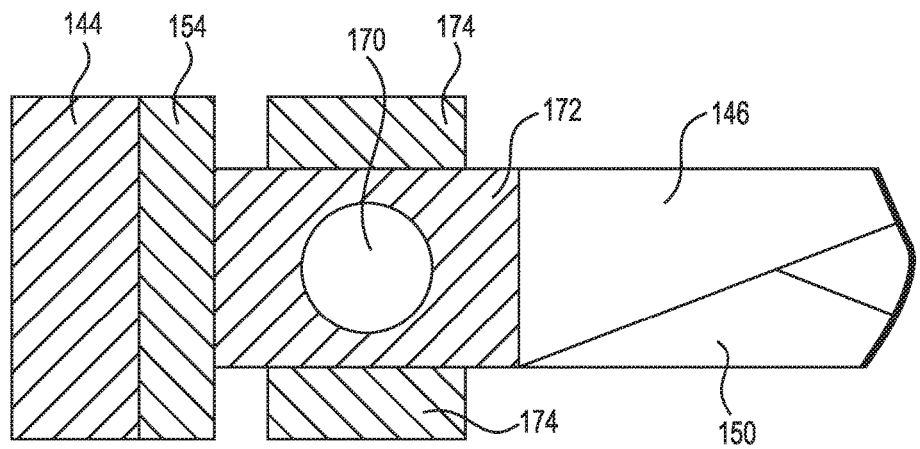
FIG. 5 is another enlarged top cross-sectional view of a portion of an embodiment of a head stack assembly, in accordance with the invention.

FIG. 5 provides for a variation of the configuration of PZT of FIG. 4 and instead illustrates threaded rod 170, a threaded member 172 and two PZT plates 174 positioned at the top and bottom of the threaded member 172. As shown, the threaded member 172 is designed so that its leftmost surface will be in contact with an adaptor 154 adjacent to a center block 144 as a piezoelectric motor moves up and down along a threaded rod 170. In this way, the threaded member 172 cannot rotate while the motor is moving the adaptor 154 vertically. Preferably, the contact surfaces of the leftmost surface of threaded member 172 and the inside of a vertical member of adaptor 154 provide for frictionless or nearly frictionless contact during movement of the motor so that the adaptor 154 can slide with very little resistance.

FIGS. 10A-10F illustrate an exemplary method of using a head stack assembly 400 of the present invention to access data locations on a disk of a disk stack 402. Note that only the top disk of the stack 402 is visible, although it is understood that the stack 42 includes at least two disks. As shown, head stack assembly 400 generally includes a voice coil 442, a center block 444, a first arm 446 with an associated read/write head, a second arm 448 with an associated read/write head, a C-shaped adaptor 454, and a piezoelectric motor (not visible), similar to the configuration of FIGS. 2 and 3 discussed above. Voice coil 442 is rigidly attached to the center block 444 to provide a rotary system in which actuation of the voice coil 442 causes rotation in a direction illustrated by reference numeral 460 about an axis 458 that extends through center block 444. Voice coil 442 also causes rotation in a direction opposite that illustrated by reference numeral 460. The assembly 400 further includes a threaded rod 470 positioned within adaptor 454 along which the piezoelectric motor can move. In addition, arms 446, 448 are configured so that their respective heads are not aligned with each other when viewed from above the assembly.

First and second arms 146, 150 extend radially from the piezoelectric motor such that movement of the motor along the threaded rod 170 will provide the desired vertical movement of the arms 146, 150 and their corresponding read/write heads. In the embodiment of FIG. 5 that includes two plates 174, arms 146, 150 are securely attached to the rightmost side of threaded member 172. As with the embodiment of FIGS. 3 and 4, the arms 146, 150 are configured so that their respective heads are not aligned with each other when viewed from above the assembly. With this offset, the heads are designed to not contact each other even when the motor is moving vertically to access certain disk surfaces.

Figure 6:
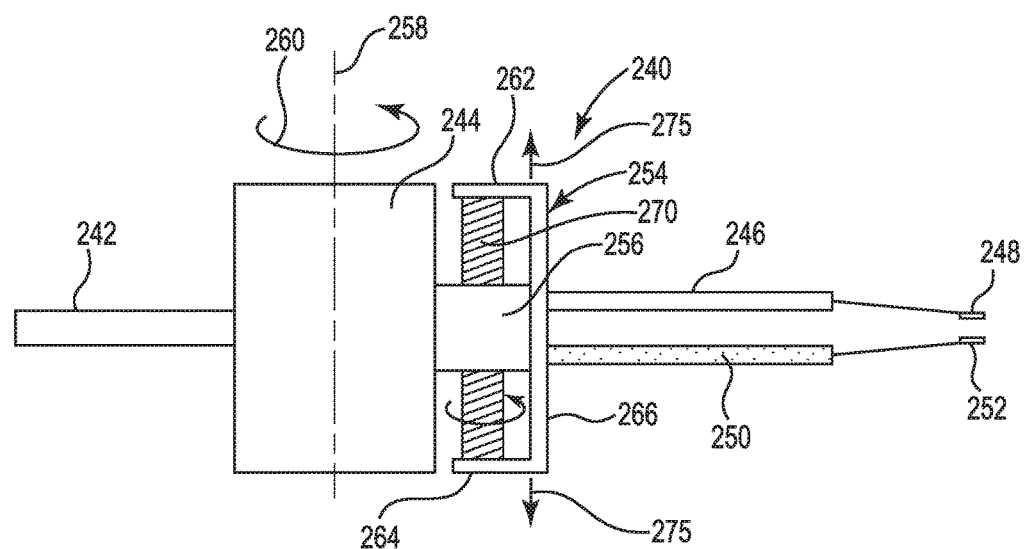
FIG. 6 is a side view of an embodiment of a head stack assembly in accordance with the invention.
Figure 7:
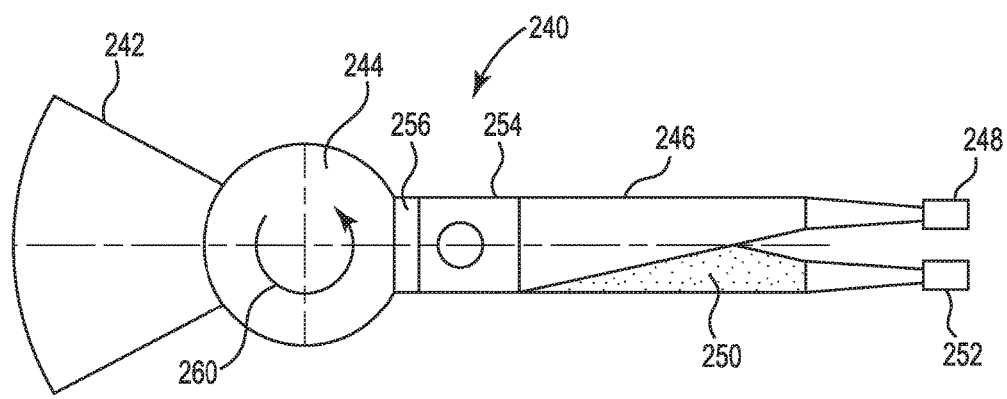
FIG. 7 is a top view of the embodiment of a head stack assembly of FIG. 6.

FIGS. 6 and 7 are schematic side and top views, respectively, of a head stack assembly (HSA) 240, which generally includes a voice coil 242, a center block 244, a first arm 246 with an associated read/write head 248, a second arm 250 with an associated read/write head 252, a C-shaped adaptor 254, and a piezoelectric motor 256. Voice coil 242 is rigidly attached to the center block 244 to provide a rotary system in which actuation of the voice coil 242 causes rotation in a direction illustrated by reference numeral 260 about an axis 258 that extends through center block 244. Voice coil 242 also causes rotation in a direction opposite that illustrated by reference numeral 260.

Adaptor 254 is referred to herein as a C-shaped adaptor 254, although it is understood that it can have a different shape or configuration than described and illustrated. For this embodiment, however, the adaptor 254 is C-shaped, with an upper member 262 spaced from a lower member 264 by a distance that corresponds with a vertical member 266. In this embodiment, adaptor 254 is oriented in the opposite direction relative to the center block 244 such that the outer surface of its vertical member 266 is spaced from and facing in the same direction as the rightmost surface of center block 244. The outside surface of motor 256 is securely connected to the center block 244, such as with adhesive or fasteners, so that the motor 256 and center block 244 are not moveable relative to each other. In addition, a threaded rod 270 along which the piezoelectric motor 256 can move is connected at its opposite ends to the upper member 262 and lower member 264 of the adaptor 254. Because the upper and lower members 262, 264 constrain the threaded rod 270, the motor 256 is likewise constrained between the upper and lower members 262, 264. In this embodiment, rotation of the threaded rod 270 relative to motor 256 will move the C-shaped adaptor 254 vertically relative to the center block 244 and voice coil 242, in directions indicated by arrows 275.

Figure 8:
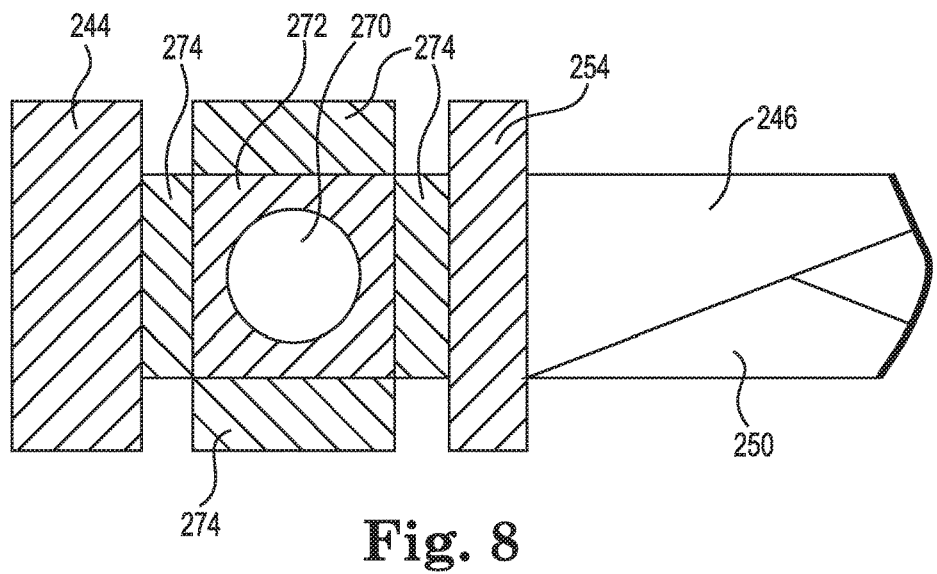
FIG. 8 is an enlarged top cross-sectional view of a portion of an embodiment of a head stack assembly in accordance with the invention.

Referring additionally to the schematic cross-sectional view of FIG. 8, the piezoelectric motor can be a miniature motor of the type discussed above relative to FIGS. 2-5, for example. The motor 256 generally includes threaded rod 270, a threaded member 272, and multiple plates 274 that are referred to herein as PZT plates, although they can instead be made of a different material. In particular, FIG. 8 illustrates a configuration that includes four of such PZT plates 274. The plate 274 that is closest to the center block 244 (i.e., the leftmost plate 274) is securely attached to center block 244, such as with fasteners and/or adhesives. The plate 274 that is closest to the adaptor 254 (i.e., the rightmost plate 274) is configured and positioned so that it will be in contact with the adaptor 254 as the adaptor 254 moves up and down relative to the threaded rod 270. In this way, the adaptor 254 cannot rotate while it is moving vertically. Preferably, the contact surfaces of the rightmost plate 274 and the inside of vertical member 266 of adaptor 254 provide for frictionless or nearly frictionless contact during movement of the adaptor 254 so that it can slide with very little resistance.

The first and second arms 246, 250 extend radially from the outside surface of C-shaped adaptor 254 such that movement of the adaptor 254 relative to the threaded rod 270 will provide the desired vertical movement of the arms 246, 250 and their corresponding read/write heads 248, 252. As is illustrated in both FIGS. 6 and 7, the arms 246, 250 are configured so that their respective heads 248, 252 are not aligned with each other when viewed from above the assembly. With this offset, the heads 248, 252 are designed to not contact each other even when adaptor 254 is moving vertically to access certain disk surfaces.

Figure 9:
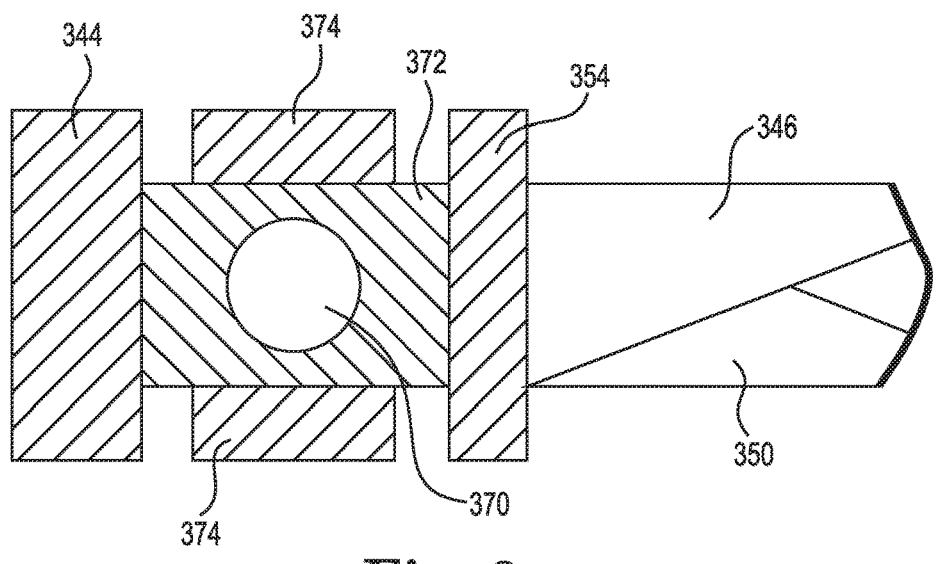
FIG. 9 is another enlarged top cross-sectional view of a portion of an embodiment of a head stack assembly in accordance with the invention.

FIG. 9 provides for a variation of the configuration of PZT plates discussed above relative to FIG. 8, and instead illustrates threaded rod 370, a threaded member 372 and two PZT plates 374, shown at the top and bottom of a threaded member 372. As shown, the threaded member 372 is designed so that its leftmost surface is securely attached to center block 344 and so that its rightmost surface is slideable relative to the C-shaped adaptor 354 as adaptor 354 moves up and down relative to threaded rod 370. Preferably, the contact surfaces of the rightmost surface of threaded member 372 and the inside of a vertical member of adaptor 354 provide for frictionless or nearly frictionless contact during movement of the motor so that the motor can slide with very little resistance.

First and second arms 346, 350 extend radially from the outer surface of adaptor 354 such that movement of the adaptor 354 along the threaded rod 370 will provide the desired vertical movement of the arms 346, 350 and their corresponding read/write heads. In the embodiment of FIG. 9 that includes two plates 374, arms 346, 350 are securely attached to the rightmost side of adaptor 354. As with the embodiment of FIGS. 7 and 8, the arms 346, 350 are configured so that their respective heads are not aligned with each other when viewed from above the assembly. With this offset, the heads are designed to not contact each other even when the adaptor 354 is moving vertically to access certain disk surfaces.

Figure 2:
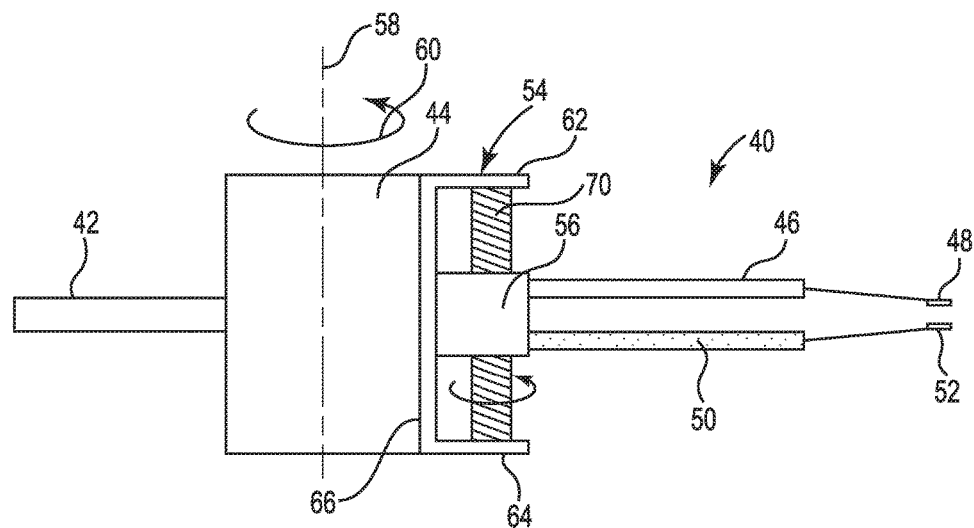
FIG. 2 is a side view of an embodiment of a head stack assembly, in accordance with the invention.
Figure 3:
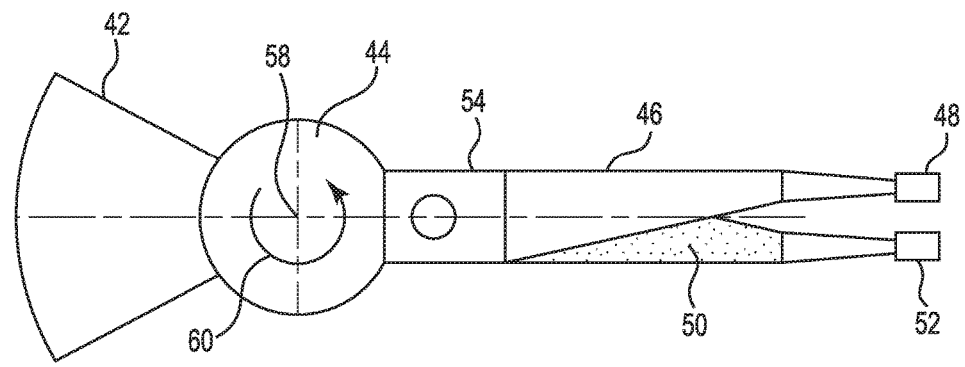
FIG. 3 is a top view of the embodiment of a head stack assembly of FIG. 2.

An additional distinction between the embodiment of FIGS. 2 and 3 and the embodiment of FIGS. 6 and 7 is the installation method of the piezoelectric motor. The PZT plates are movable and the C-shaped adaptor is fixed in FIGS. 2 and 3, while the PZT plates are fixed and the C shaped adaptor is movable in FIGS. 6 and 7.

Figure 10A:
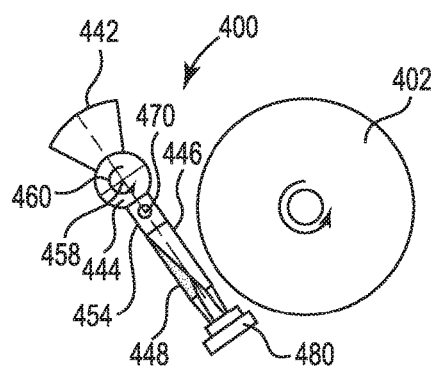
FIGS. 10A-10F are sequential top views of a portion of a hard drive in operation, including a head stack assembly of the invention and an associated disk stack.
Figure 10B:
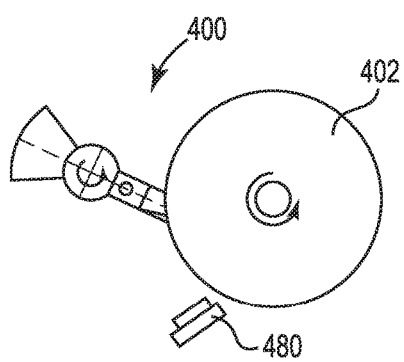

With regard to the illustrated exemplary sequential operation using the head stack assembly 400, FIG. 10A illustrates the drive in its stand-by or "off" position during which the heads associated with the arms 446, 448 are parked or resting on a ramp 480. When a signal is provided to access data tracks of one of the disks in the stack, the voice coil provides a signal to rotate the head stack assembly 400 about axis 458 until the read/write heads at the ends of arms 446, 448 are positioned adjacent to opposite sides of one of the disks, as shown in FIG. 10B. Because one of the lower disks is being accessed in this Figure, the top disk of the stack 402 obscures a view of the position of the distal ends of the arms 446, 448.

Figure 10C:
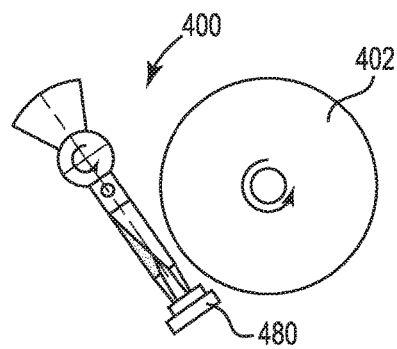
Figure 10D:
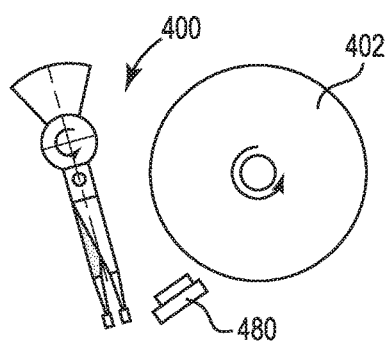
Figure 10E:
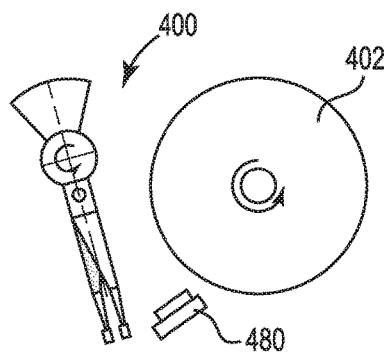
Figure 10F:
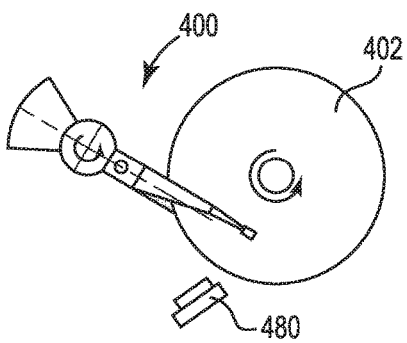
Figure 11:
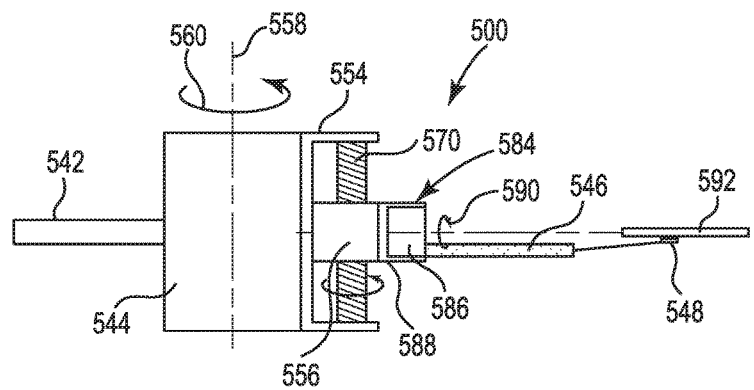
FIG. 11 is a side view of an embodiment of a head stack assembly, in accordance with the invention, with a read/write head accessing a bottom disk surface.
Figure 12:
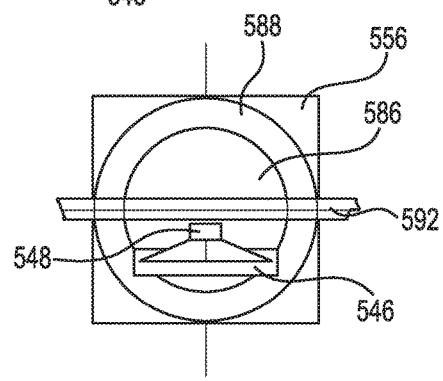
FIG. 12 is an end view of the configuration of the head stack assembly of FIG. 11.
Figure 13:
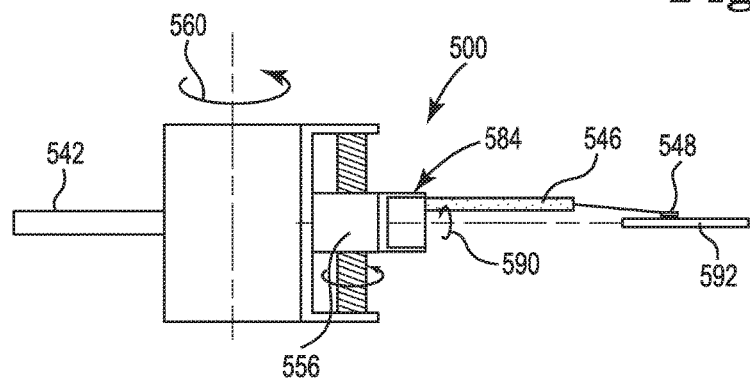
FIG. 13 is a side view of another configuration of a head stack assembly of FIG. 11, with the read/write head accessing a top disk surface.
Figure 14:
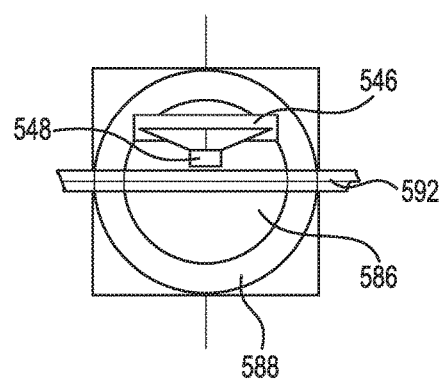
FIG. 14 is an end view of the configuration of the head stack assembly of FIG. 13.

Next, the drive receives a signal to read or write data on a different disk than the one currently being accessed. In this situation, the head stack assembly 400 rotates again about the axis 458 until the heads associated with the arms 446, 448 are located adjacent to ramp fin 480, as illustrated in FIG. 10C. The head stack assembly 400 continues to rotate until the arms 446, 448 are past the ramp fin 480, as is illustrated in FIG. 10D. Because the arms are configured so that their respective read/write heads are offset relative to each other, they will not come in contact with each other, even when they are free from the ramp fin 480. At this point, the piezoelectric motor will be activated to move the head stack assembly 400 along the threaded rod 470 to the desired vertical position for accessing another disk, as is illustrated in FIG. 10E. The head stack assembly 400 is then rotated back to and then past the ramp fin 480 and toward the disk stack 402 until the read/write heads at the ends of arms 446, 448 are positioned adjacent to opposite sides of one of the disks, as shown in FIG. 10F. Because the disk accessed in this step of the example is the top disk, the end of arm 446 and its associated slider and read/write head are visible.

In order to further reduce costs from the embodiments discussed above, another embodiment provides for a head stack assembly that instead includes only a single arm. With this embodiment, a common motor referred to herein as a "flipping motor" is inserted between a proximal end of the arm and a piezoelectric motor or C-shaped adaptor, which is activated to rotate the arm 180 degrees to access an opposite surface of a disk. In particular, FIGS. 11-14 illustrate a head stack assembly 500, which generally includes a voice coil 542, a center block 544, a single arm 546 with an associated read/write head 548, a C-shaped adaptor 554, and a piezoelectric motor 556. The voice coil 542 is rigidly attached to the center block 544 to provide a rotary system in which actuation of the voice coil 542 causes rotation in a direction illustrated by reference numeral 560 about an axis 558 that extends through center block 544. Voice coil 542 also causes rotation in a direction opposite that illustrated by reference numeral 560. A threaded rod 570 is provided within the adaptor 554 along which the piezoelectric motor 556 can move. The motor 556 may also include one or more PZT plates, as is described above relative to other embodiments of the invention.

In this embodiment, a flipping motor 584 is provided, which includes a motor rotor 586 connected to the piezoelectric motor 556 via a motor stator 588. The arm 546 extends radially from the flipping motor 584 such that movement of the motor 556 along the threaded rod 570 will provide the desired vertical movement of the arm 546 and its corresponding read/write head 548, and the flipping motor 584 will provide the desired rotation of the arm 546 and its corresponding read/write head 548 in a direction designated by reference number 590. It is noted that while these figures illustrate the C-shaped adaptor 554 in the orientation illustrated in FIG. 2, the C-shaped adaptor 544 can instead be oriented similar to the C-shaped adaptor 254 of FIG. 6 so that instead of the motor stator 588 being securely attached to the piezoelectric motor 556 directly, the motor stator can instead be securely attached to the outer vertical surface of the C-shaped adaptor 554

In operation, the head stack assembly 500 operates by receiving a signal to access data tracks of one of the disks in a stack, then the voice coil 542 provides a signal to rotate the head stack assembly 500 about axis 558 until the read/write head 548 at the end of arm 546 is positioned adjacent one side of disk 592. Next, the drive gets a signal to read or write data on a different side of disk 592 (and/or a different disk in the stack) than the one currently being accessed. The head stack assembly 500 will then rotate again about the axis 558 until the head associated with the arm 546 is spaced from the disk 592, which may include also being rotated past an associated ramp. At this point, the piezoelectric motor 556 can be activated to move the head stack assembly 500 along the threaded rod 570 to the desired vertical position for accessing another disk and/or the flipping motor 584 can be activated to rotate the head stack assembly 180 degrees for accessing the opposite side of disk 592 or another disk in the stack.

Figure 15:
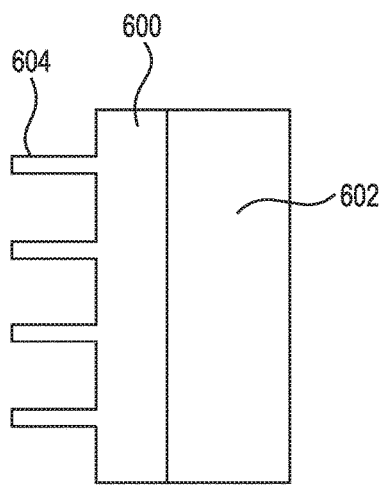
FIG. 15 is a side view of an embodiment of a ramp for use with the head stack assemblies of the invention.
Figure 16:
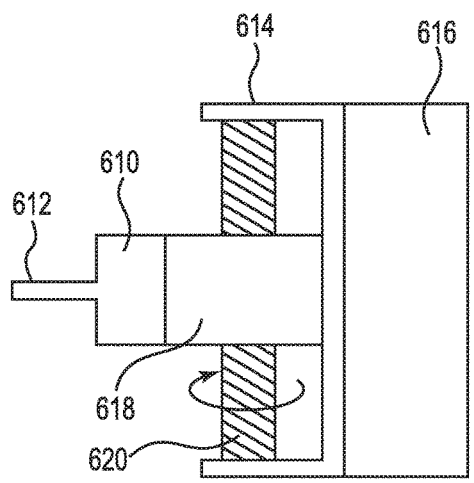
FIG. 16 is a side view of an embodiment of a moveable ramp for use with the head stack assemblies of the invention.
Figure 17:
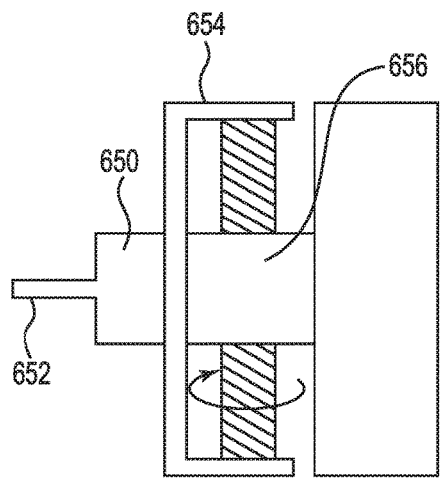
FIG. 17 is a side view of an embodiment of a moveable ramp for use with the head stack assemblies of the invention.

Referring now to FIGS. 15-17, various versions of ramps are illustrated and described for use with head stack assemblies of the invention. FIG. 15 illustrates a ramp 600 that extends from a base 602, and multiple extending ramp fins 604. The number of ramp fins 604 will typically correspond with the number of disks provided in a disk stack. With this embodiment, the ramp 600 is in a fixed location relative to the hard disk drive and the corresponding head stack assembly.

FIG. 16 illustrates an alternative configuration in which a movable ramp 610 is provided, which includes a single extending ramp fin 612. Such a configuration can further reduce costs of an HDD by reducing the number of required ramp fins. This configuration includes a C-shaped adaptor 614 attached to a base 616, along with a piezoelectric motor 618 that is moveable along a threaded rod 620 positioned within the adaptor 614. The ramp 610 is connected to an outer surface of the motor 618 so that it is vertically movable with activation of the motor 618. In this way, the single ramp fin 612 is positionable relative to the read/write head(s) of the moveable head suspension assemblies of the invention. FIG. 17 includes an alternative configuration of a ramp 650 with a single extending ramp fin 652 that operates in a similar manner to the ramp 610, but ramp 650 is instead attached to the outer surface of a C-shaped adaptor 654 that is in turn connected to an outer surface of a piezoelectric motor 656. While both of the ramp embodiments of FIGS. 16 and 17 include a single ramp fin, it is contemplated that the number of ramp fins can be greater than one but less than the total number of disks.

Figure 18A:
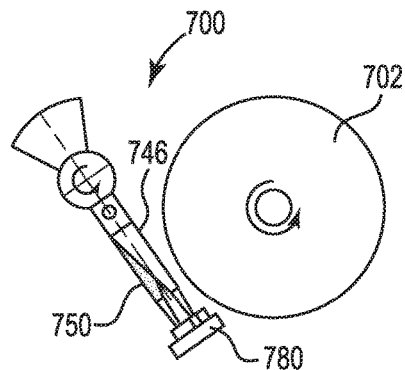
FIGS. 18A-18E are sequential top views of a portion of a hard drive in operation, including a head stack assembly and moveable ramp configuration in accordance with the invention.
Figure 18B:
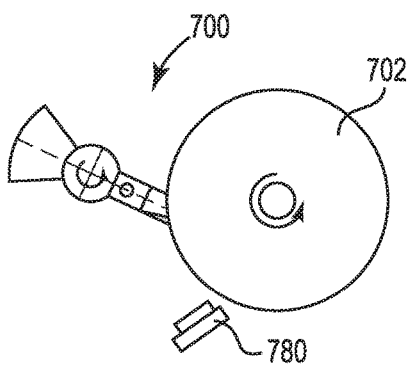

FIGS. 18A-18E illustrate the working principle of the movable ramps discussed above in an exemplary sequential operation using a head stack assembly 700, FIG. 18A illustrates the drive in its stand-by or "off" position during which the heads associated with the arms 746, 750 are parked or resting on a ramp fin 780. When a signal is provided to access data tracks of one of the disks in a stack 702, the voice coil provides a signal to rotate the head stack assembly 700 until the read/write heads at the ends of arms 746, 750 are positioned adjacent to opposite sides of one of the disks, as shown in FIG. 18B. Because one of the lower disks is being accessed in this Figure, the top disk of the stack 702 obscures a view of the position of the distal ends of the arms 746, 750.

Figure 18C:
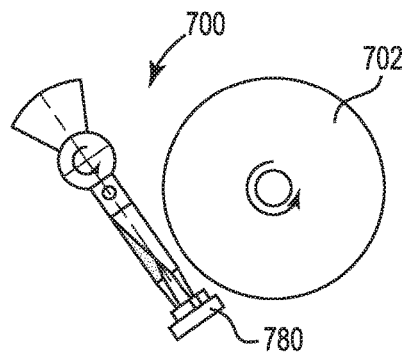
Figure 18D:
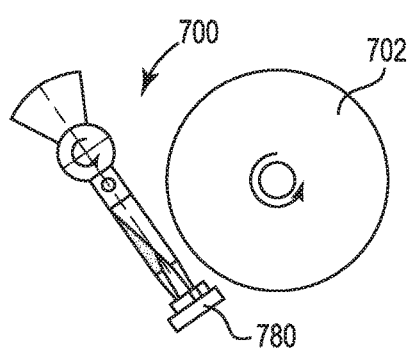
Figure 18E:
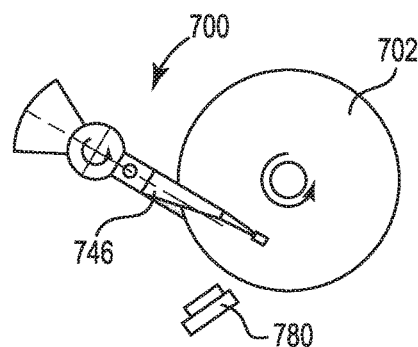

Next, the drive receives a signal to read or write data on a different disk than the one currently being accessed. In this situation, the head stack assembly 700 rotates again until the heads associated with the arms 746, 750 are located adjacent to ramp fin 780, as illustrated in FIG. 18C. At this point, the piezoelectric motor will be activated to move the head stack assembly 700 to the desired vertical position for accessing another disk, and the piezoelectric motor associated with the ramp fin 780 will also move to be adjacent to the disk that is being accessed, as is illustrated in FIG. 18D. The head stack assembly 700 is then rotated back to the disk stack 702 until the read/write heads at the ends of arms 746, 750 are positioned adjacent to opposite sides of one of the disks, as shown in FIG. 18E. Because the disk accessed in this step of the example is the top disk, the end of arm 746 and its associated slider and read/write head are visible.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A disk drive comprising a plurality of magnetic recording disks and at least one read/write head for writing data to and reading data from the disks, the disk drive comprising:
   a rotatable center block comprising a vertical axis and a mounting member;
   a first motor attached to the center block for rotating the center block about the vertical axis;
   a first vertical threaded rod positioned in the mounting member;
   a second motor moveable along the vertical threaded rod;
   at least one head suspension arm extending outwardly from the second motor;
   at least one read/write head mounted to a distal end of the at least one head suspension arm;
   wherein the plurality of magnetic disks are arranged in a stack, wherein each disk of the stack comprises at least one disk surface comprising data storage tracks;
   wherein the at least one arm is vertically movable along the vertical threaded rod by the second motor to position the at least one read/write head for accessing data on at least one of the plurality of disks.

2. The disk drive of claim 1, wherein the second motor is a piezoelectric motor assembly.

3. The disk drive of claim 1, wherein the mounting member comprises an upper plate spaced from a lower plate, and wherein the vertical threaded rod is positioned between the upper and lower plates.

4. The disk drive of claim 1, wherein the at least one head suspension arm comprises a first head suspension arm and a second head suspension arm extending outwardly from the second motor, wherein the first and second head suspension arms each comprise a read/write head at a distal end, and wherein the read/write heads of the first and second head suspension arms are offset relative to each other in a offset direction that is perpendicular to a direction in which the second motor moves along the vertical threaded rod.

5. The disk drive of claim 1, further comprising a ramp with at least one extending ramp fin.

6. The disk drive of claim 5, wherein the number of extending ramp fins is the same as the number of disks in the stack.

7. The disk drive of claim 5, wherein the ramp is connected to a third motor that is vertically moveable along a second vertical threaded rod to move the at least one head suspension arm to access multiple disks of the stack.

8. The disk drive of claim 7, wherein the third motor is configured for synchronized movement with the second motor.

9. The disk drive of claim 1, wherein the at least one arm is vertically movable and repositionable along the vertical threaded rod to position the at least one read/write head in multiple vertical locations to access data on multiple disks.

10. The disk drive of claim 1, further comprising a fourth motor for rotating the at least one suspension arm 180 degrees relative to surfaces of the disks.

11. The disk drive of claim 1, wherein the number of disk surfaces of the stack of disks is greater than the number of read/write heads.

12. The disk drive of claim 2, wherein the piezoelectric motor assembly further comprises a threaded member that is engageable with the first vertical threaded rod.

13. The disk drive of claim 12, wherein the piezoelectric motor assembly further comprises multiple plates.

14. The disk drive of claim 13, wherein at least one of the multiple plates contacts the mounting member and prevents rotation of the threaded member relative to the mounting member.

15. The disk drive of claim 1, wherein the mounting member comprises a C-shaped member.

16. The disk drive of claim 1, wherein the at least one head suspension arm is rotatable about an axis that is parallel to one of the disk surfaces.

* * * * *